US012659382B2

(12) United States Patent
Patton et al.

(10) Patent No.: US 12,659,382 B2
(45) Date of Patent: Jun. 16, 2026

(54) VEHICLE MOBILITY SYSTEM COMMUNICATIONS NETWORK

(71) Applicant: AMPHION TECHNOLOGY, LLC, Sterling Heights, MI (US)

(72) Inventors: Eric Patton, Shelby Township, MI (US); Robert Matthews, Sterling Heights, MI (US)

(73) Assignee: AMPHION TECHNOLOGY, LLC, Sterling Heights, MI (US)

( * ) Notice: Subject to any disclaimer, the term of this patent is extended or adjusted under 35 U.S.C. 154(b) by 0 days.

(21) Appl. No.: 18/869,434

(22) PCT Filed: Apr. 4, 2024

(86) PCT No.: PCT/US2024/023057
§ 371 (c)(1),
(2) Date: Nov. 26, 2024

(87) PCT Pub. No.: WO2024/211556
PCT Pub. Date: Oct. 10, 2024

(65) Prior Publication Data
US 2025/0211654 A1 Jun. 26, 2025

Related U.S. Application Data

(60) Provisional application No. 63/457,123, filed on Apr. 4, 2023.

(51) Int. Cl.
*G06F 15/16* (2006.01)
*H04L 12/12* (2006.01)
(Continued)

(52) U.S. Cl.
CPC ............ *H04L 67/565* (2022.05); *H04L 12/12* (2013.01); *H04L 67/12* (2013.01)

(58) Field of Classification Search
CPC ........ H04L 67/565; H04L 12/22; H04L 67/12
See application file for complete search history.

(56) References Cited

U.S. PATENT DOCUMENTS

2005/0206332 A1    9/2005  Shimizu
2013/0325323 A1*  12/2013  Breed ................ G01C 21/3667
701/420

(Continued)

OTHER PUBLICATIONS

International Search Report and Written Opinion for International Application No. PCT/US2024/023057 mailed Jul. 10, 2024.

(Continued)

*Primary Examiner* — Normin Abedin
(74) *Attorney, Agent, or Firm* — Carlson, Gaskey & Olds, P.C.

(57) ABSTRACT

A vehicle mobility communication network includes a computing device operable to operate a vehicle mobility control system. The vehicle mobility control system including an interface operable to communicate information indicative of a current state and/or pending action of a plurality of vehicle components, and a plurality of component control modules associated with the plurality of vehicle components. Each of the plurality of control modules is operable to control corresponding ones of the plurality of vehicle components independently based on the information indicative of the current state and/or pending action of the two or more vehicle components.

21 Claims, 8 Drawing Sheets

(51) Int. Cl.
    H04L 67/12 (2022.01)
    H04L 67/565 (2022.01)

(56) References Cited

U.S. PATENT DOCUMENTS

| 2014/0143839 | A1 | 5/2014 | Ricci |
| 2017/0123422 | A1 | 5/2017 | Kentley et al. |
| 2019/0066406 | A1 | 2/2019 | Sarwar et al. |
| 2019/0121357 | A1* | 4/2019 | Zhang ................. G05D 1/0088 |
| 2022/0371867 | A1 | 11/2022 | Grothaus et al. |
| 2024/0330014 | A1 | 10/2024 | Joseph |

OTHER PUBLICATIONS

International Preliminary Report on Patentability for International Application No. PCT/US2024/023057 mailed Oct. 16, 2025.

* cited by examiner

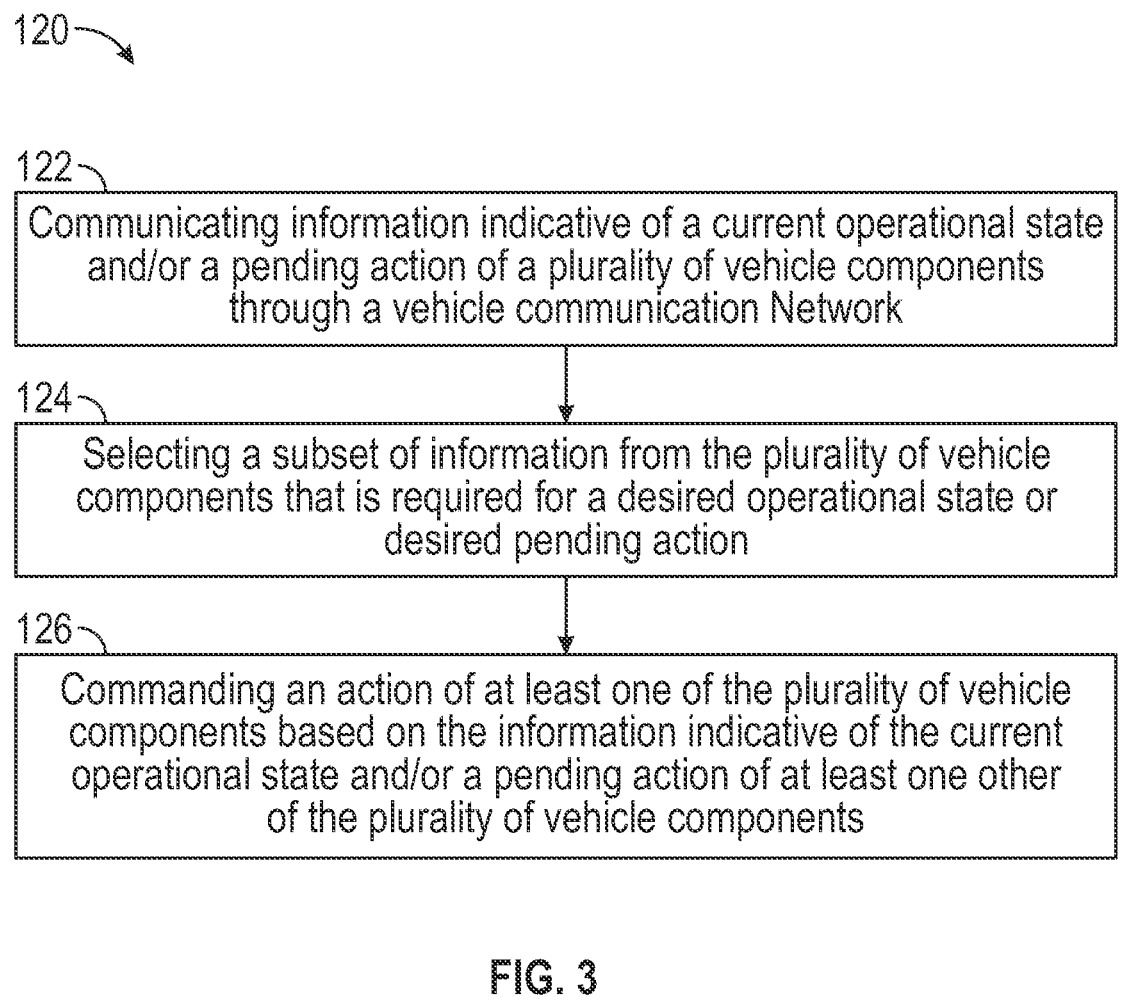

120

122

Communicating information indicative of a current operational state and/or a pending action of a plurality of vehicle components through a vehicle communication Network

124

Selecting a subset of information from the plurality of vehicle components that is required for a desired operational state or desired pending action

126

Commanding an action of at least one of the plurality of vehicle components based on the information indicative of the current operational state and/or a pending action of at least one other of the plurality of vehicle components

FIG. 3

VEHICLE MOBILITY SYSTEM COMMUNICATIONS NETWORK

CROSS REFERENCE TO RELATED APPLICATION

This application claims priority to U.S. Provisional Application Ser. No. 63/457,123 filed on Apr. 4, 2023.

BACKGROUND

An established Classical CAN (Controller Area Network) protocol provides increased vehicle functionality by establishing a uniform protocol for communication and control of machinery. Essentially, anything that involves movement in machinery may utilize a CAN system. However, the demand for sophisticated Electronic Control Units (ECU) and safety features such as Advanced Driver-Assistance Systems (ADAS) increased exponentially. To meet the growing demands, Classical CAN was required to jump ahead into a new protocol that could withstand the heavy data traffic that was inevitably approaching. Existing protocols based on Classical CAN include: SAE J1939—Designed for heavy duty commercial vehicle sector; ISO 11783—Designed for Tractors and machinery for agriculture sector; NMEA 2000®—Designed for marine electronic device; and MIL-CAN A/B—Built on top of SAE J1939 and CAN open standard, respectively.

Classical CAN networks would only allow 8 data bytes to be transferred per node, which would be sufficient back in the 1980s. However, modern electronic control units (ECUs) add an inrush of data that would not be able to quickly decipher logic in an 8-bit connection. Generic message structure does not provide standard operational messages that easily support mobility subsystem communication. i.e. the driver has provided a command to accelerate and turn left.

Expanded data throughput is available on a host of different commercially available communications networks such as but not limited to, Ethernet physical layer or CAN FD. CAN FD is a data-communication protocol used for broadcasting sensor data and control information on multiple wire interconnections between different parts of electronic instrumentation and control system and is typically used in modern high-performance vehicles. CAN FD is an extension to the original "classical" CAN bus protocol that was specified in ISO 11898-1.

The primary difference between the classical CAN and any increased network packet structure, (e.g., CAN FD), is the ability to dynamically switch between different data rates and between longer or shorter messages. Faster data speed and increased data capacity enhancements results in several system operational advantages compared to classic CAN where commands issued by an executing ECU software reach the output controller much faster. Increased network packet structures are typically used in high performance ECUs of modern vehicles that may include many ECUs that use these network packet structures to exchange information over the CAN bus when the engine is running or when the vehicle is moving.

SUMMARY

A vehicle mobility communication network according to an exemplary embodiment of this disclosure includes, among other possible things, a computing device including one or more processors coupled to a memory device, the one or more processors collectively operable to operate a vehicle mobility control system. The vehicle mobility control system including an interface operable to communicate information indicative of a current state and/or pending action of a plurality of vehicle components, and a plurality of component control modules associated with the plurality of vehicle components, each of the plurality of control modules is operable to control corresponding ones of the plurality of vehicle components independently based on the information indicative of the current state and/or pending action of the two or more vehicle components.

In any implementation, the vehicle mobility communication network, the interface may be operable to obtain information from at least one sensor system that provides information indicative of an ambient environment surrounding the vehicle.

In any implementation of the vehicle mobility communication network, each of the component control modules are operable to control operation of the corresponding ones of the plurality of vehicle components based on information from the at least one sensor system.

In any implementation of the vehicle mobility communication network, each of the component control modules are operable to control operation of the corresponding ones of the plurality of vehicle components to adjust an operational state in anticipation of a characteristic of the ambient environment based on information from the at least one sensor system.

In any implementation of the vehicle mobility communication network, the interface is further operable to communicate information from a duty specific system associated with the vehicle, and each of the component control modules is further operable to control operation of the corresponding ones of the vehicle components based on the information from the duty specific system.

In any implementation of the vehicle mobility communication network for a vehicle, the interface is further operable to receive and communicate information obtained from sources external to the vehicle.

In any implementation of the vehicle mobility communication network, the information is communicated according to a defined message structure, and the defined message structure includes an identifier that is indicative of from which of the plurality of vehicle components the information originates.

In any implementation of the vehicle mobility communication network, the defined message structure includes an encryption portion operable to validate the veracity and origin of the information.

In any implementation of the vehicle mobility communication network, the identifier is further indicative of which one of the plurality of component control modules from which the information originates.

In any implementation of the mobility communication network, the defined message structure further comprises one of a plurality of mobility specific message structures that are applicable to a subset of the plurality of vehicle components.

A vehicle mobility control system according to another exemplary embodiment includes, among other things, a computing device including one or more processors coupled to a memory device, the one or more processors collectively operable to operate a vehicle mobility control system. The vehicle mobility control system includes a suspension system including at least one suspension control module that is operable to control a plurality of suspension components, and an interface operable to communicate information indicative of a current state and/or pending action of the plurality of suspension components and at least one other vehicle system, wherein the suspension control module is operable to control the plurality of suspension components based on the information indicative of the current state and/or pending action of the suspension system components and the at least one other vehicle system and the information is communicated according to a defined message structure that includes an identifier that is indicative of an origin of information.

In an implementation of the vehicle mobility control system, the at least one other vehicle system comprises a duty specific system including at least one duty specific control module that is operable to control a plurality of duty specific components, and the suspension control module is operable to control operation of the plurality of suspension components based on information indicative of a current state and/or pending action of the duty specific system.

In an implementation of the vehicle mobility control system, a propulsion system including at least one propulsion system control module is operable to control a plurality of propulsion system components, and the suspension control module is operable to control operation of the plurality of suspension components based on information indicative of a current state and/or pending action of the duty specific system.

In an implementation of vehicle mobility control system, at least one sensor system provides information indicative of an ambient environment surrounding the vehicle to the interface; and the suspension control module is operable to control operation of the plurality of suspension components based on information indicative of a current state and/or pending action of the duty specific system.

In an implementation of the vehicle mobility control system, at least one of the suspension control module, the propulsion control module and the duty specific control module are operable to control operation of the corresponding one of the plurality of suspension components, the plurality of propulsion components and the plurality of duty specific components to adjust an operational state in anticipation of a characteristic of the ambient environment based on information from the at least one sensor system.

A method of controlling operation of a land based vehicle according to another exemplary embodiment of this disclosure includes, among other possible things, communicating information indicative of a current operational state and/or a pending action of a plurality of vehicle components through a vehicle communication network, selecting a subset of information from the plurality of vehicle components that is required for a desired operational state or desired pending action, and commanding an action of at least one of the plurality of vehicle components based on the information indicative of the current operational state and/or a pending action of at least one other of the plurality of vehicle components.

An implementation of the method includes communicating information from at least one sensor system across the vehicle communications network and commanding the action of at least one of the plurality of vehicle components further based in information form the at least one sensor system.

An implementation of the method includes adjusting an operational state of at least one of the plurality of vehicle components in anticipation of a characteristic of the ambient environment based on information from the at least one sensor system.

An implementation of the method includes communicating information indicative of operation of a duty specific system associated with the vehicle and adjusting an operational state of at least one of the plurality of vehicle components based on information indicative of a current state and/or pending action of the duty specific system.

An implementation of the method includes communicating information indicative of operation of a propulsion system through the vehicle communications network and adjusting an operational state of at least one of the plurality of vehicle components based on information indicative of a current state and/or pending action of the propulsion system.

An implementation of the method includes communicating information over the vehicle communications network according to a predefined message structure that includes an identifier that is indicative of an origin of the information and which of the plurality of vehicle components the information originates an encryption portion operable to validate a veracity and origin of the information.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

DESCRIPTION OF THE DRAWINGS

FIG. 3 is a flow diagram of an example operational embodiment.

DESCRIPTION

Figure 1:
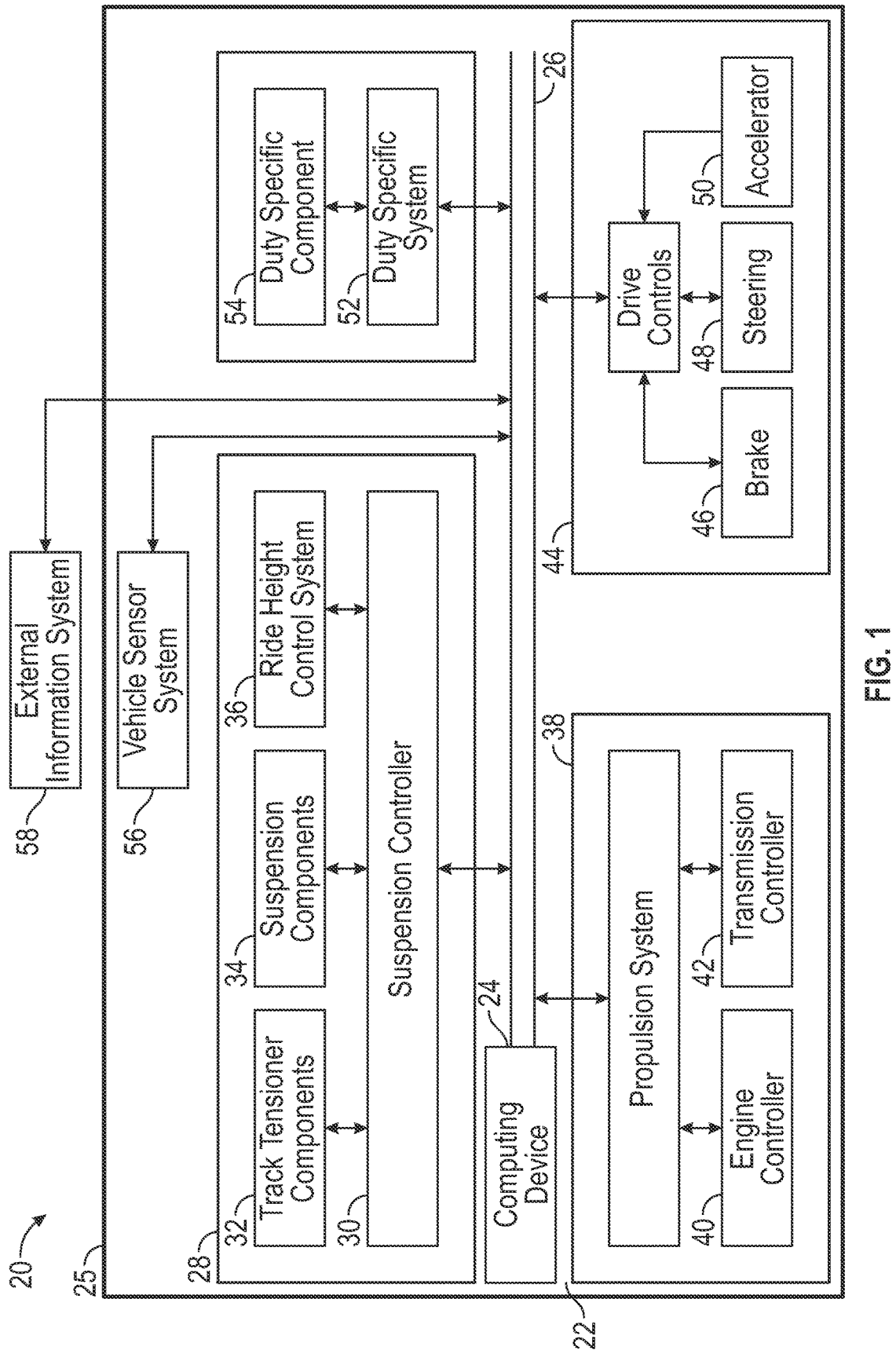
FIG. 1 is a schematic view of an example vehicle including a vehicle mobility communication network.

Referring to FIG. 1, a vehicle 20 is schematically shown that includes a vehicle mobility system 25 and communication network 22 for the vehicle mobility system 25 operable to communicate information indicative of a current state and/or pending actions of a vehicle component between a plurality of vehicle components and a corresponding plurality of control modules. A communication interface in the form of a vehicle communication network 26 provides for the exchange of information between the plurality of vehicle components. The vehicle communication network 26 may include any one, or multiple physical communication networks provided within a vehicle. The vehicle communication network 26 may include a controller area network (CAN), controller area network flexible data-rate (CAN FD), ethernet, Flexray™ or any equivalent communication network applicable to providing communication between controllers of a located throughout the vehicle 20. The communication of information between the plurality of components and controllers provides for actuation of each vehicle component in a manner that accounts for the current state and/or pending actions of the other vehicle components. Rather than each component acting in isolation, each component generates an actuation response that is based on information from components across the entire vehicle.

The disclosed vehicle mobility communication network is a software layer, which is communicated through an existing network communications protocol and physical transmission layer. The communications protocol layers could be CAN-FD, Ethernet or any other protocol utilized for communication of information between vehicle components. The network communications protocol handles overall data packet transmission and error correction. However, the network communications protocol does not include provisions that are necessary for communicating between mobility specific subsystems and components.

The example vehicle 20 is schematically shown and includes primary mobility systems such as the suspension system 28, propulsion system 38 and the drive control system 44. The example vehicle 20 further includes a duty specific system 52 including a duty specific component 54 that provides a specific function that may not contribute to the movement of the vehicle, but that provides a mission specific function. Such mission specific functions may include operation of a weapons system, a communication system or other vehicle system that is not directly operable to maneuver a vehicle. However, the mobility systems such as the suspension system 28, propulsion system 38 and control inputs from the driver controls 44 may have a direct effect on operation of the duty specific system 52 such that operation of the mobility systems is at least partially performed based on information from the duty specific system 52.

In one disclosed example embodiment, the suspension system 28 includes a suspension controller 30, a track tensioner component 32, an actuatable suspension component 34, and a ride height control system 36. It should be appreciated, that the example suspension system components are disclosed by way of example and other components and systems are within the contemplation and scope of this disclosure.

In one disclosed example embodiment, the propulsion system 38 includes an engine controller 40 to manage operation of a vehicle power plant. The vehicle power plant may comprise a turbine engine, internal combustion engine, and/or an electric drive system. Moreover, the components and systems that are required for operation of a vehicle power plant, such as a fuel system, electrical system, cooling system and any other accessory system may be controlled by the engine controller 40. The engine controller 40 may be a single controller, or a plurality of controllers that operate together to govern operation.

The propulsion system 38 may further include a transmission controller 42 that controls the components and systems utilized for transferring power from the vehicle power plant to drive systems. The drive systems, in one example embodiment, may include a track system, wheel systems and any components that are required to operate such systems.

The example drive control 44 provides information indicative of control inputs to direct the vehicle 20. Such inputs include information that is indicative of operation of a brake system 46, steering system 48, an accelerator 50, and any other information that is generated when directing operation of the vehicle 20.

The example vehicle 20 is described as including the suspension system 28, propulsion system 38, drive controls 44 and the duty specific system 52, however other systems as may be part of a vehicle may be utilized and are within the contemplation of this disclosure.

A vehicle sensor system 56 may also provide information to the communications network 26 that is utilized for operation of the vehicle components. Additionally, external information 58 may be communicated to the communications network 26 and provides further information that is useful for determination of component operation.

Figure 2:
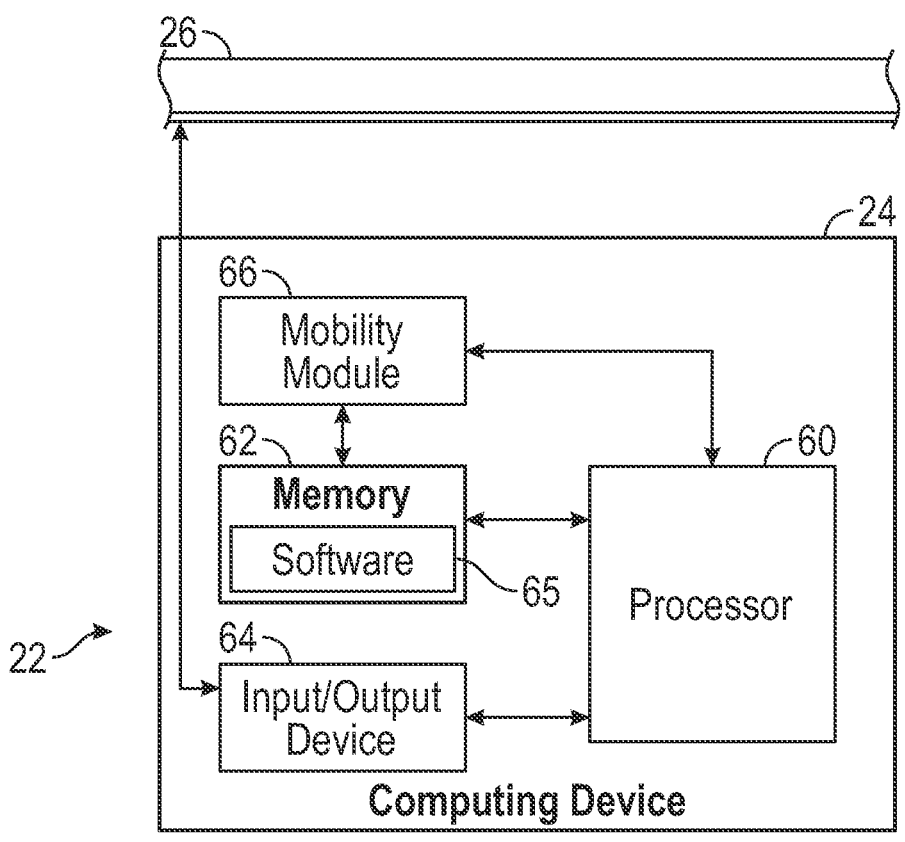
FIG. 2 is a schematic view of an example computing device.

Referring to FIG. 2, with continued reference to FIG. 1, the example communication network 22 is embodied as part of a computing device 24 and/or instructions for operating a computing device 24 that is in communication with each of the vehicle systems through the vehicle communication network 26. The example computing device 24 is a device and system for performing necessary computing or calculation operations of the communication network 22. The computing device 24 may be specially constructed for operation of the communication network 22, or it may comprise at least a general-purpose computer selectively activated or reconfigured by software instructions stored in a memory device. The computing device 24 may further be part of vehicle controller and/or an engine control unit (ECU).

The example computing device 24 includes a processor 60 operatively connected to a memory device 62 and an input/output communication interface device 64. The processor 60 may include one or more microprocessors, microcontrollers, application specific integrated circuits (ASICs), or the like. The memory device 62 may include any one or combination of volatile memory elements (e.g., random access memory (RAM, such as DRAM, SRAM, SDRAM, VRAM, etc.)) and/or nonvolatile memory elements (e.g., ROM, hard drive, tape, CD-ROM, etc.). Moreover, the memory device 62 may incorporate electronic, magnetic, optical, and/or other types of storage media. The memory device 62 stores software instructions 65 which, when executed by the processor 60, cause the processor to implement the various features and actions of the example communication network 22. In one example embodiment, the instructions are embodied in a mobility module 66. The mobility module 66 may be the software instructions 65 saved in the memory device 62 or as the separate mobility module 66 accessed by the processor to perform the functions of the communication network 22.

The example communication network 22 is embodied as software instructions 65 saved within the memory device 62 or as the mobility module 66. The system 22 provides a defined messaging architecture that operates over the vehicle communications network 26 to translate mobility controller signals into a defined message structure for communication throughout a vehicle network. Moreover, the communication network 22 provides for the export and import of data into the each of the separate controllers of the vehicle. Referring to FIG. 3 with continued reference to the previous figures, a flow diagram of an example operational embodiment is schematically shown and indicated at 120. Initial operation includes communicating information indicative of a current operational state and/or a pending action of a plurality of vehicle components through vehicle communications network 26 as indicated at 122. The communication of information proceeds continually through operation of the vehicle. Communication of specific information may be governed by a predetermined hierarchy that is based on a default setting. The hierarchy of information may also vary depending on vehicle operating conditions. For, example, information relating to the duty specific system 52 may take precedent over information for other systems, when the duty specific system 52 is operating.

Moreover, not all of the vehicle systems may require the communicated information. Accordingly, a select subset of information from the plurality of vehicle components may be determined based on what is required for a desired operation as is indicated at 124. The subset of information may be predefined and triggered in response to information from a specific component that is required for a desired operational state or desired pending action.

The method further proceeds with a corresponding one of the controllers commanding an action of a vehicle component based on the communicated information as is indicated at 126. The action is based on the information indicative of the current operational state and/or a pending action of at least one other vehicle component.

Additionally, information from vehicle sensor systems 56 may also be communicated across the vehicle communication network 26 and used to formulate commands for the action of a vehicle component. The information forms the sensor system 56 may be indicative of a vehicle operating state and/or of ambient conditions around the vehicle. In one example, at least one of the vehicle components is operated in anticipation of a characteristic of the ambient environment surrounding a vehicle. The ambient environment may be obstacles on the ground, terrain features or any other characteristic that may warrant adjustment to vehicle operation.

Figure 4:
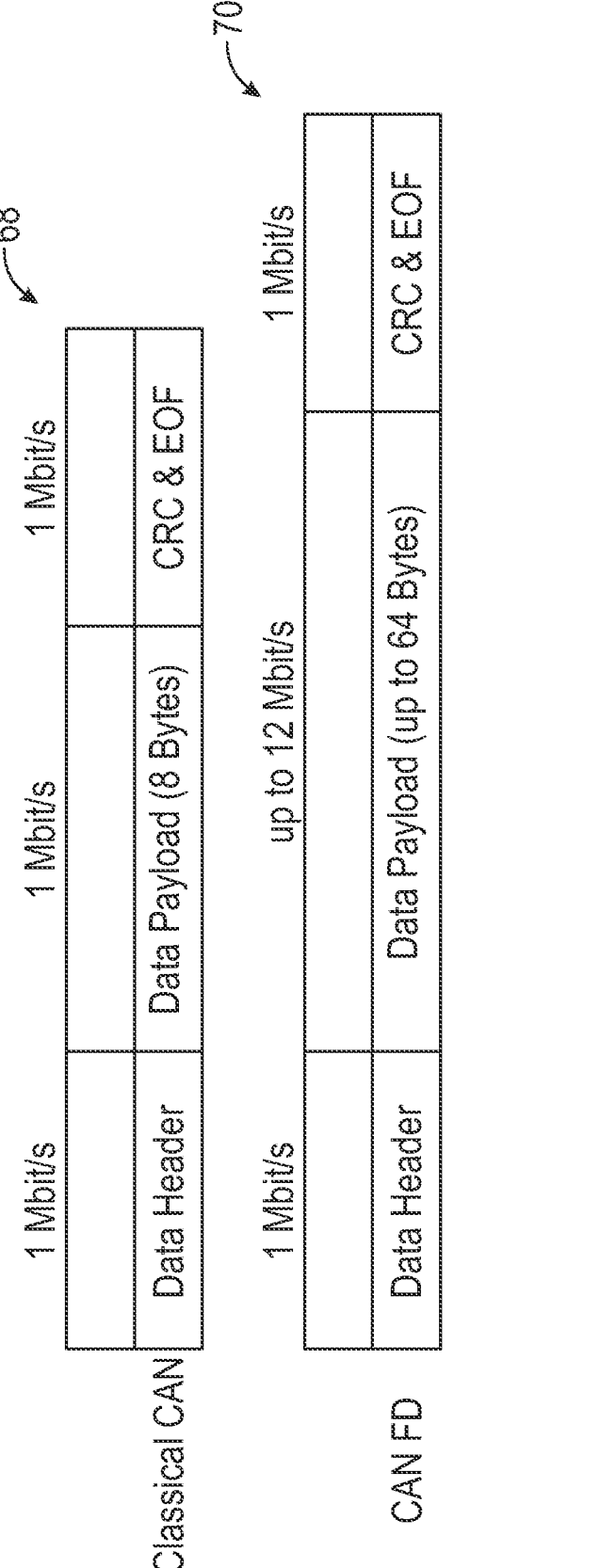
FIG. 4 is a schematic view of example message structures.

Referring to FIG. 4, a classical controller area network (CAN) data message structure 68 and an increased network data message structure 70 are schematically shown. The primary difference between the classical CAN message structure 68 and the increased network message structure 70, (e.g., CAN FD), is the ability to dynamically switch between different data rates and between longer or shorter messages. Faster data speed and increased data capacity enhancements results in several system operational advantages compared to classic CAN where commands issued by an executing ECU software reach the output controller much faster. Increased network packet structures are typically used in high performance ECUs of modern vehicles that may include many ECUs that use these network packet structures to exchange information over the CAN bus when the engine is running or when the vehicle is moving. It should be appreciated that although the message structures 68 and 70 for a CAN and CAN FD communication bus are shown and described as one example embodiment, other message structures for other vehicle communication network architectures may also be utilized and are within the scope and contemplation of this disclosure.

Figure 5:
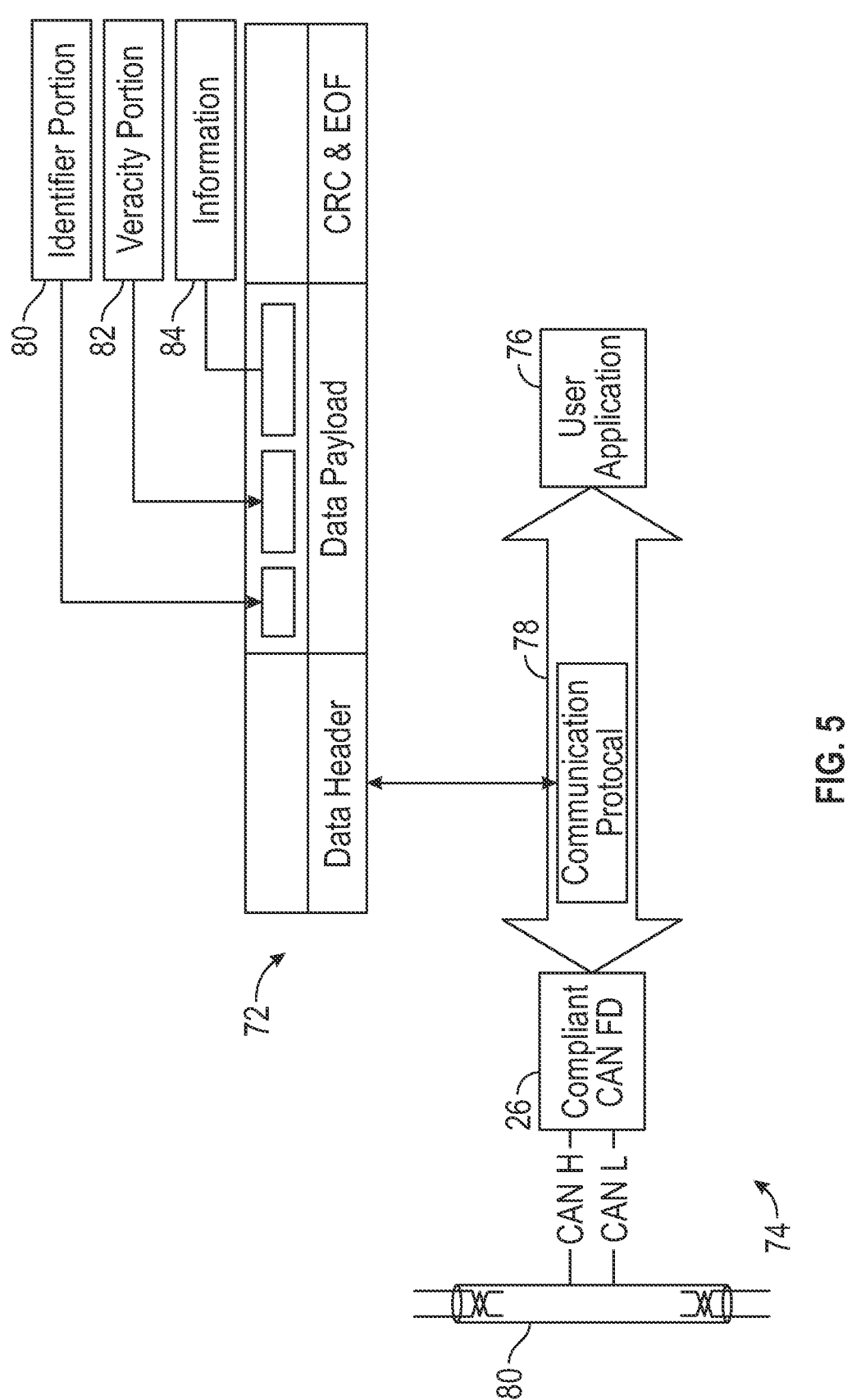
FIG. 5 is a schematic view of an example message structure embodiment.

Referring to FIG. 5, with continued reference to FIGS. 1 and 2, an example network protocol according to a disclosed example embodiment is schematically shown and indicated at 74. The example protocol 74 is a high-level communication protocol designed to use higher speed networks and is optimized for land based vehicle systems including functionality of optimization for real-time mobility control, end-to-end data encryption, and standardized message identification for mobility ECUs. The proposed network protocol 74 is a software layer controlled by the computing device 24 to facilitate communication between the various components of the vehicle 22 and a user application 76. The user application 76 refers to instructions for a specific vehicle operation that are communicated across the communications network 26 to the plurality of vehicle components indicated schematically at 80. The example message protocol is not a separate structure but is instead, the message format 78 that is communicated between user applications 76 and the vehicle component 80.

The primary functional components of the communications network 22 embodied as either the software instructions 65 or the mobility module 66 is to provide a specific dictionary of message types with structural definitions for each. For example, one set of messages may be defined for each type of subsystem component within the vehicle mobility system communication network. Within each message set, are defined message types, which each define where within each message specific data is contained.

The specific component subset and specific message type within the subset may be transmitted somewhere within the message header, and identifies a definition for the message that corresponds with the definition provided in the dictionary.

In one example embodiment, the dictionary contains a description and definition of each message structure and is updated with each subsequent release of the network communications architecture. The definitions are stored within a permanent system memory of each subsystem component. The network communications architecture is published at specified release intervals and definitions within each subsystem component are updated to correspond with a current release. An example dictionary may include provisions to store previous message definitions to provide backward compatibility. The example system may operate according to a publish and subscribe architecture, such that each subsystem publishes under the protocol and other subsystems are programed to subscribe to specific subsystems and message types. Messages types and messages from other, non-subscribed systems would be ignored.

The example communication protocol 74, includes a set of mobility specific message structures that encompass standard mobility system functions. This message structure provides for various mobility system components to communicate about pending actions or operational states. The example vehicle systems include those described and shown relative to FIG. 1 and may further include individual suspension units, internal combustion engines, transmissions (of various types) electric motors (central and wheel end), final drives (if applicable), track tensioners (if applicable) and any associated components or systems connected to the aforementioned components.

In one example embodiment, an example message 72 has a structure that includes an identifier portion 80, a veracity portion 82 and an information portion 84. The identifier portion 80 provides an indication of an origin of the message 72, such as from which of the suspensions components 34 the information 84 is from. The veracity portion 82 provides for the encryption and verification of the message's authenticity and completeness. The example message 72 further includes a data header, a cyclical redundancy check (CRC) and end of file (EOF) portions as are known.

The proposed communication protocol provides for the components 80 to publish information about their current or pending states, which then is used by control system logic embodied in the mobility module 66 to incorporate commands from different components that are at least partially based on information communicated over the communications network 26 to improve overall vehicle operational performance.

In addition to the message dictionary, the software layer defines protocols for message frequency and priority for specific subsystem types under certain conditions and circumstances. For example, at operating conditions of network saturation, certain messages may be delayed or denied publishing with preference provided for priority messages that are communicated.

Additionally, the example communication system 22 may contain a handshake protocol to initialize systems onto the network and identify the initialized system to other systems on the network. In one disclosed example, the handshake protocol may include a function that assigns a network address, or other identifier utilized for recognition that enables communications.

The communication system 22 may also contain additional error correction mechanisms independent of those error correction schemes provided by the communication network 26. The error correction schemes may include a checksum or any other error correction provision that may be contained within each data payload. The communications system 22 may include programming for an interconnect between the vehicle mobility system, vehicle network and other networks. The other networks may be provided to perform as a peering location between two networks. The communication system 22 may include information that enables linking separate networks as a subnet or a virtual local area network (vLAN). The ability to link with separate networks may be utilized when operating on the same commercial network protocol and physical layer (i.e. ethernet). The communication system 22 further includes information related to encryption of the network message traffic, such that only appropriate system components may access the information contained in each message. In one example embodiment, the communication system 22 uses a public key cryptography to implement this encryption scheme or other security measures to safeguard and limit access to information communicated throughout the vehicle or outside the vehicle.

In one example, a practical vehicle operational benefit may include greatly improved platform stability, improved vehicle maneuverability, increased vehicle safety, reduced rollover potential, improved braking performance, streamlined driver interface through single driver user interface for all mobility systems, improved system performance for semi-active and fully active suspension systems. Moreover, the improved information communication speed provides for use of additional decentralized controllers for operation of each of the vehicle systems. The decentralized controls may also facilitate further capabilities of autonomous controlled vehicles.

The example decentralized communication network 22 (FIG. 1) hardware controller moves a portion of processing requirements to individual suspension units thereby reducing data traffic and improving performance through edge computing practices. This promotes overall modularity of the system, the benefits of which are similar to the Modular Active Protection System controller, which provides for independent system components to communicate and operate collaboratively. While the MAPS controller is utilized as a centralized control scheme, the proposed system may be at least partially decentralized, which may aid in reducing single points of failure, improve overall system performance, and provides for a more modular system than can be effected with a centralized scheme.

Figure 6:
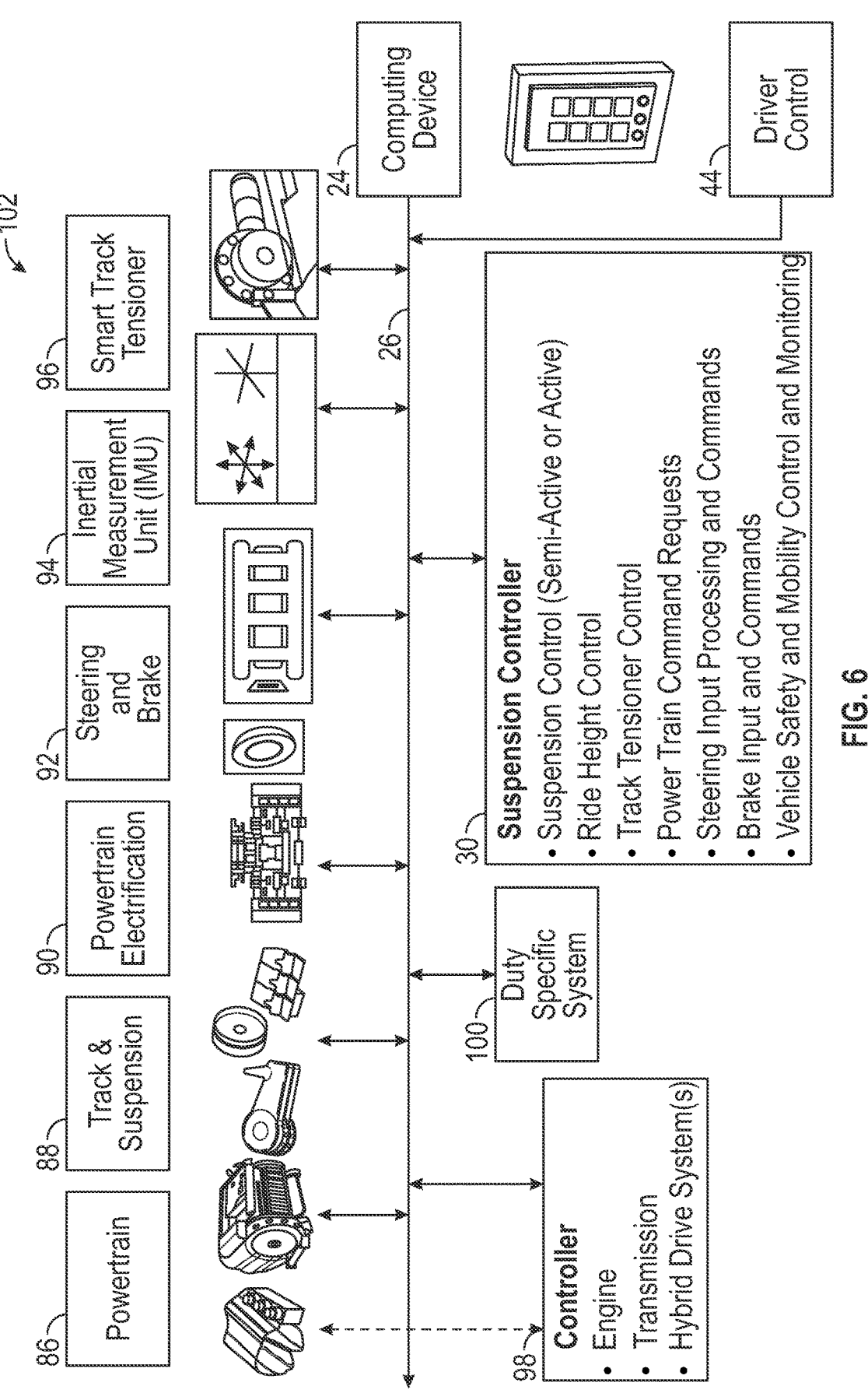
FIG. 6 is another schematic view of the example vehicle mobility communication network.

Referring FIG. 6 with further reference to FIG. 1, the example communication network enables communications network 26 to include import data between other subsystems, such that each mobility system may respond to data and actions from other systems. Such communication across all systems enables potential crew reduction through autonomous actions of coupled systems, e.g., obstacle avoidance and threat avoidance, where mobility systems can enable expanded capabilities from other systems. The example sensor system 94 is disclosed as an inertial measurement unit that provides information indicative a vehicle orientation along different axes. Other sensor systems are also contemplated and within the scope of this disclosure.

In one example embodiment, a mobility control system 102 includes the communication network 26 that operates to provide for the efficient exchange of information between various vehicle systems. In one example embodiment, the mobility control system 102 operates with a powertrain system 86, track and suspension system 88, electric powertrain 90, steering and brake system 92, a sensor system 94, a track tensioning system 96, and a duty specific system 100. Each of the systems 86, 88, 90, 92, 94, 96, and 100 are in communication through the communications network 26 with a communication protocol that is operated by the computing device 24. Each of the systems 86, 88, 90, 92, 94, 96 and 100 provide information that is indicative to a current state and/or a pending state to the communications network 26. The computing device 24 provides for the information to be translated into a predetermined message structure for communication to other systems that may than be actuated based on that information. Information from the driver controls 44 is also communicated to through the communications network 26.

The example communications network 106 operates to communicate information to controllers 98 for the powertrain system 86 and 30 for the suspension system components. Each of the controllers 98, 30 uses the information from the other systems to determine proper actuation. For example, when a driver inputs a direction through driver controls 44, that direction is communicated through the communications network 26 to the other systems 86, 88, 90, 92, 94, 96 and 100. The mobility system 102 provides for the distribution of that information to the other systems 86, 88, 90, 92, 94, 96 and 100 according to a predetermined priority for that information.

For example, when the driver control 44 is actuated by an operator to initiate a turn that information is communicated to the powertrain controller 98 and to the suspension controller 30. The powertrain controller 98 may modify operation of the powertrain to accommodate that turn, for example, to slow the vehicle to accommodate the turn. Additionally, the suspension controller 30 may adjust the track and suspension system 88 to stiffen portions to further accommodate the turn. In another example, the duty specific system 100 may provide information on a specific function that is communicated to the other systems 86, 88, 90, 92, 94, 96 and 100. Each system 86, 88, 90, 92, 94, 96 and 100 would then change or modify the current or pending state based the information from the duty specific system 100. For example, the suspension on one side of the vehicle may adjusted to accommodate operation of the duty specific system 100.

Figure 7:
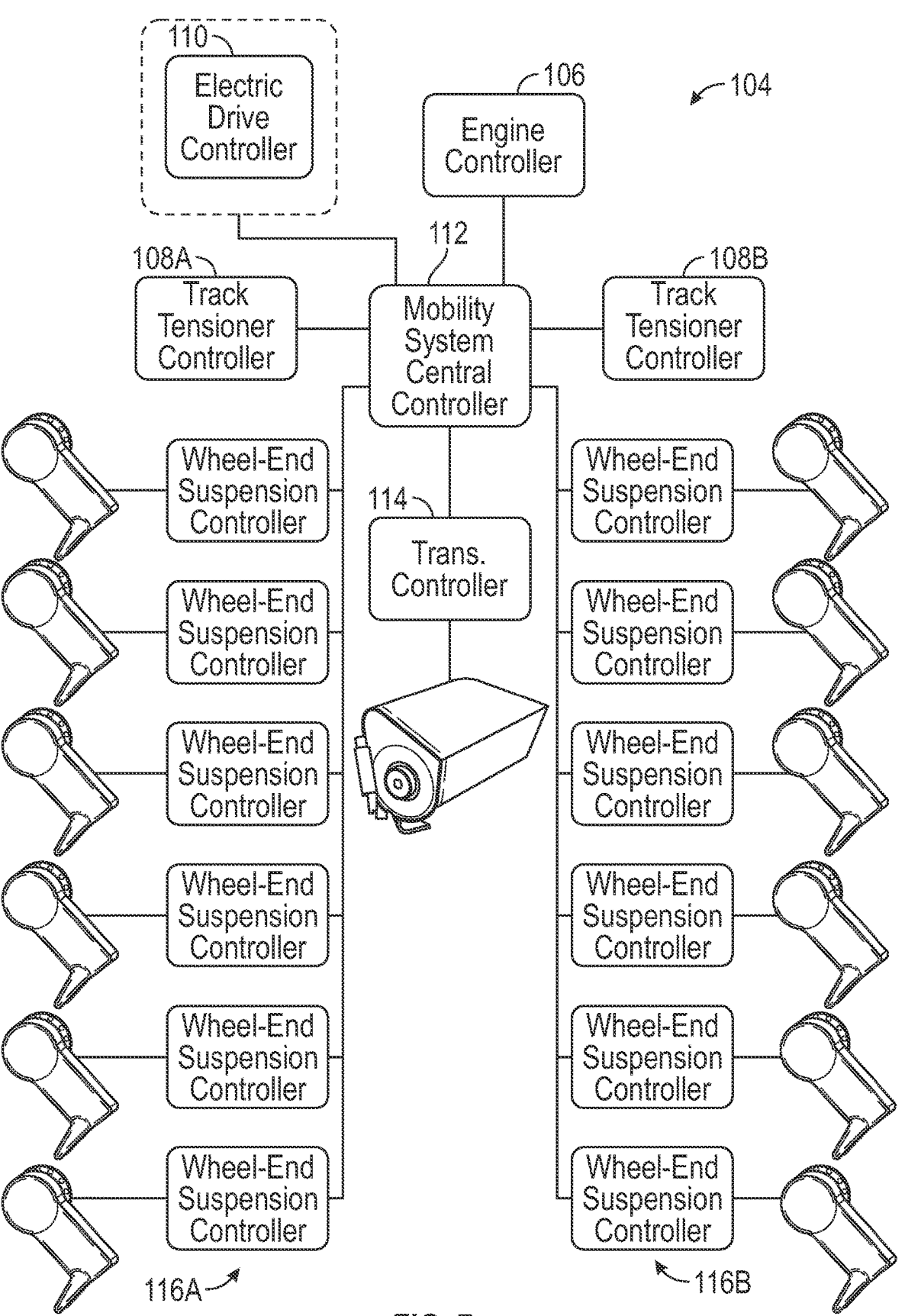
FIG. 7 is yet another schematic view of the example vehicle mobility communication network that would communicate over an example vehicle communication network embodiment.

Referring to FIG. 7, an example group of vehicle components includes a decentralized controller system 104 with controllers distributed to each system that act to control a specific system or component based on information provided by the mobility control system 112. In one example embodiment, the mobility control system 112 provides for communication between decentralized controllers for powertrain and suspension systems. In the disclosed example an engine controller 106, left and right track tensioner controllers 108A-B, electric drive controller 110, a transmission controller 114, a left group of wheel end suspension controllers 116A, and a right group of wheel end suspension controllers 116B are all in communication with the mobility system controller 112.

The exchange of information between the controllers 106, 108A-B, 110, and 116A-B is provided to enable each to command operation, at least partially, based on operation of the other vehicle components. The decentralized controllers 106, 108A-B, 110, and 116A-B move a portion of processing capacity to each individual controller and speed reaction times. The example mobility control system 112 enables the communication that reduces information traffic along the communications network 26 to provide the improved performance.

Moreover, the import of data provided by the mobility control system 112 may import information from autonomous vehicle sensors, such as autonomous look-ahead sensors to allow a vehicle suspension to react before encountering obstacles rather than as they immediately act upon a vehicle during transit. Data import may pair suitably with fully active suspension to enables a vehicle to raise and lower wheel ends to match a sensed contour of obstacles thereby providing an optimized ride quality and platform stability.

Figure 8:
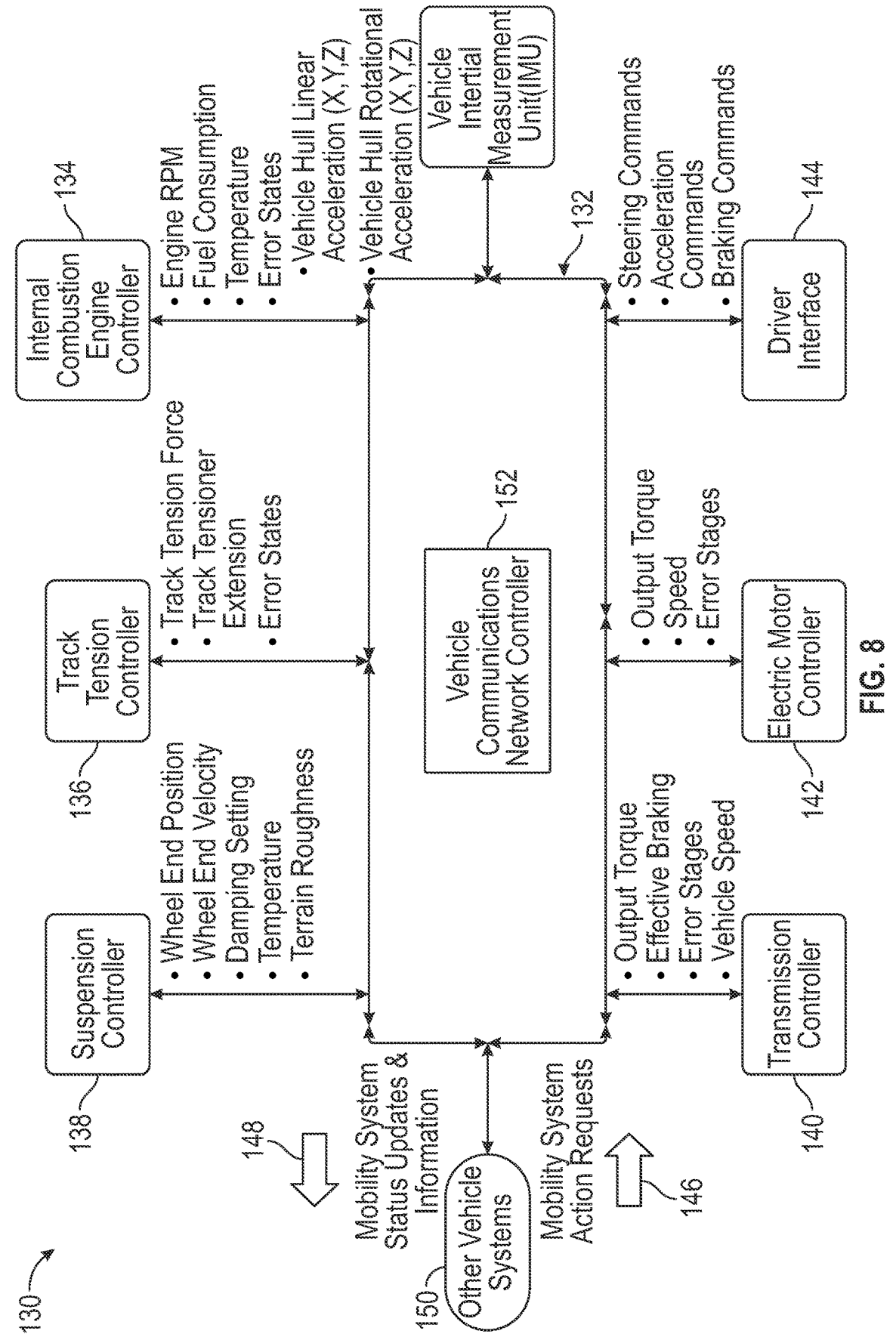
FIG. 8 is a schematic view of an example vehicle communication network embodiment.

Referring to FIG. 8, a schematic view of an example vehicle mobility system 130 including a communications network 132. The mobility system 130 includes plurality of mobility subsystem component controllers that are decentralized and publish messages to the communication network 132 following a message structure similar to that embodied in FIG. 4. FIG. 8 illustrates schematically that the example communications network 132 provides for the communication of information in a free, non-linear manner. Information may be communicated directly between controllers, to all of the controllers or to a subset of the controllers. Information does not need to go through any one specific controller or central control location.

The communication network 132 includes the controller 132 that provides for the control of messages and data between the various subsystem component controllers. In one example embodiment, the subsystem controllers include an engine controller 134, a track tension controller 136, a suspension controller 138, a transmission controller 140, an electric motor controller 142, and a driver interface 44. Each of the controllers 134, 136, 138, 140, 142 and 144 communicate information over the network 132 with a message structure corresponding with each individual controller 134, 136, 138, 140, 142 and 144. The message structures may correspond to data type, component type, mission type and/or any other structures that provides for efficiently communicating information to perform a vehicle function.

Moreover, the example communications network 132 provides for communication of vehicle and/or component status as indicated at 148 with other vehicle systems 150. The other vehicle systems 150 may include information systems, communication systems, and/or any other vehicle systems that are not directly linked through the communications network 132. Additionally, the communications network 132 may accept action request 146 from the other vehicle systems 150.

Each of the controllers 134, 136, 138, 140, 142 and 144 generate information and data specific to the operation of the corresponding system. Examples of data from each system is shown in FIG. 8. Although examples of information are shown in FIG. 8, other types of data and information may be communicated and are within the contemplation and scope of this disclosure.

Accordingly, the example vehicle mobility communication networks provide the communication of information between the plurality of components and controllers across existing communication bus configurations that enables actuation of each vehicle component in a manner that accounts for the current state and/or pending actions of the other vehicle components.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A vehicle mobility communication network comprising:
   a computing device including one or more processors coupled to a memory device, the one or more processors collectively operable to operate a vehicle mobility control system, the vehicle mobility control system comprising;
      an interface operable to communicate information indictive of a current state and/or pending action of a plurality of vehicle components; and
      a plurality of component control modules associated with the plurality of vehicle components, each of the plurality of control modules is configured and programmed to control corresponding ones of the plurality of vehicle components independently based on the information indicative of the current state and/or pending action of the two or more vehicle components, wherein each of the plurality of component control modules are configured and programmed to receive information over the interface from other ones of the plurality of controller and each of the plurality of controllers is further configured and programmed to operate and control the corresponding one of the plurality of vehicle components based in information obtained from the other of the plurality of control modules.

2. The vehicle mobility communication network for a vehicle as recited in claim 1, wherein the interface is operable to obtain information from at least one sensor system that provides information indicative of an ambient environment surrounding the vehicle.

3. The vehicle mobility communication network for a vehicle as recited in claim 2, wherein each of the component control modules is operable to control operation of the corresponding ones of the plurality of vehicle components based on information from the at least one sensor system.

4. The vehicle mobility communication network for a vehicle as recited in claim 3, wherein each of the component control modules are operable to control operation of the corresponding ones of the plurality of vehicle components to adjust an operational state in anticipation of a characteristic of the ambient environment based on information from the at least one sensor system.

5. The vehicle mobility communication network for a vehicle as recited in claim 1, wherein the interface is further operable to communicate information from a duty specific system associated with the vehicle, and each of the component control modules is further operable to control operation of the corresponding ones of the vehicle components based on the information from the duty specific system.

6. The vehicle mobility communication network for a vehicle as recited in claim 1, wherein the interface is further operable to receive and communicate information obtained from sources external to the vehicle.

7. The vehicle mobility communication network for a vehicle as recited in claim 1, wherein the information is communicated according to a defined message structure, and the defined message structure includes an identifier that is indicative of from which of the plurality of vehicle components the information originates.

8. The vehicle mobility communication network as recited in claim 7, wherein the defined message structure includes an encryption portion operable to validate the veracity and origin of the information.

9. The vehicle mobility communication network as recited in claim 7, wherein the identifier is further indictive of which one of the plurality of component control modules from which the information originates.

10. The vehicle mobility communication network as recited in claim 7, wherein the defined message structure further comprises one of a plurality of mobility specific message structures that are applicable to a subset of the plurality of vehicle components.

11. The vehicle mobility communication network as recited in claim 1, wherein the interface communicates the information using a controller area network flexible data-rate (CAN FD) protocol of transmitting more than 8 bytes of date per message frame.

12. The vehicle mobility communications network as recited in claim 1, wherein the information is communicated according to a defined message structure including an identifier field specifying a priority and type of the information, and a data field containing one of a current state or a pending action.

13. The vehicle mobility communications network as recited in claim 1, wherein the plurality of vehicle components comprises a suspension system component, a propulsion system component, and a braking system component that are ach controlled independently by a corresponding one or more of the plurality of controllers based on information communicated over the interface to coordinate vehicle mobility.

14. A method of controlling operation of a land based vehicle, the method comprising:

communicating information indicative of a current operational state and/or a pending action of a plurality of vehicle components through a vehicle communication network;

selecting a subset of information from the plurality of vehicle components that is required for a desired operational state or desired pending action;

communicating the subset of information to each of a plurality of controllers corresponding to the plurality of vehicle components, wherein the plurality of controllers communicate with each other the subset of information over the vehicle communication network;

determining an action of at least some of the plurality of vehicle components with a corresponding one of the plurality of controllers based on the communicated subset of information; and commanding an action of at least one of the plurality of vehicle components based on the information indicative of the current operational state and/or a pending action of at least one other of the plurality of vehicle components with the controller of the plurality of controllers corresponding to the at least one other of the vehicle components.

15. The method as recited in claim 14, further including communicating information from at least one sensor system across the vehicle communications network and commanding the action of at least one of the plurality of vehicle components further based in information form the at least one sensor system.

16. The method as recited in claim 15, further comprising adjusting an operational state of at least one of the plurality of vehicle components in anticipation of a characteristic of the ambient environment based on information from the at least one sensor system.

17. The method as recited in claim 15, further comprising receiving the information from at least one external source and adjusting an operational state of at least one of the plurality of vehicle components based on the received information.

18. The method as recited in claim 14, further comprising communicating information indicative of operation of a duty specific system associated with the vehicle and adjusting an operational state of at least one of the plurality of vehicle components based on information indicative of a current state and/or pending action of the duty specific system.

19. The method as recited in claim 18, further comprising communicating information indicative of operation of a propulsion system through the vehicle communications network and adjusting an operational state of at least one of the plurality of vehicle components based on information indicative of a current state and/or pending action of the propulsion system.

20. The method as recited in claim 14, further comprising communicating information over the vehicle communications network according to a predefined message structure that includes an identifier that is indicative of an origin of the information and which of the plurality of vehicle components the information originates an encryption portion operable to validate a veracity and origin of the information.

21. The method as recited in claim 14, wherein communication of information through the vehicle communication network comprises communicating using a Controller Area Network Flexible Data-rat protocol of transmitting more than 8 bytes of date per message frame.

* * * * *